United States Patent

Nakai et al.

[11] Patent Number: 5,846,651
[45] Date of Patent: Dec. 8, 1998

[54] ADHESIVE TAPE MADE OF POLYVINYL CHLORIDE AND PROCESS FOR ITS PRODUCTION

[75] Inventors: Takeyuki Nakai; Hirotaka Arai, both of Nagoya, Japan

[73] Assignee: Mitsubishi Chemical MKV Company, Tokyo, Japan

[21] Appl. No.: 690,867

[22] Filed: Aug. 1, 1996

[30] Foreign Application Priority Data

Aug. 2, 1995 [JP] Japan .................................... 7-197519
Aug. 17, 1995 [JP] Japan .................................... 7-209514

[51] Int. Cl.$^6$ ................................ B32B 7/12; B32B 5/16
[52] U.S. Cl. ........................ 428/343; 428/143; 428/156; 428/167; 428/168; 428/213; 428/323; 428/330
[58] Field of Search ...................................... 428/343, 354, 428/323, 330, 156, 141, 167, 213, 214, 188, 168; 427/207.1, 208

[56] References Cited

U.S. PATENT DOCUMENTS

| 3,832,267 | 8/1974 | Liu | .......................................... 428/167 |
| 5,158,557 | 10/1992 | Noreen et al. | ...................... 428/156 X |
| 5,316,825 | 5/1994 | Nakai et al. | . |
| 5,589,246 | 12/1996 | Calhoun et al. | ..................... 428/167 X |

FOREIGN PATENT DOCUMENTS

| 50 13306 | 5/1975 | Japan . |
| 56 120784 | 9/1981 | Japan . |
| 4 316431 | 11/1992 | Japan . |
| 4 369525 | 12/1992 | Japan . |
| 5 38235 | 2/1993 | Japan . |
| 5 153869 | 6/1993 | Japan . |
| 5 184263 | 7/1993 | Japan . |
| 5 239239 | 9/1993 | Japan . |
| 6 141693 | 5/1994 | Japan . |
| 6 218808 | 8/1994 | Japan . |
| 6 218809 | 8/1994 | Japan . |
| 6 306189 | 11/1994 | Japan . |
| 7 286143 | 10/1995 | Japan . |
| 6 306190 | 11/1996 | Japan . |

*Primary Examiner*—Daniel Zirker
*Attorney, Agent, or Firm*—Oblon, Spivak, McClelland, Maier & Neustadt, P.C.

[57] ABSTRACT

An adhesive tape made of polyvinyl chloride consisting essentially of a vinyl chloride resin film (hereinafter referred to as "PVC film") which contains from 5 to 60 parts by weight of inorganic fine particles having an average particle size of from 0.1 to 10 $\mu$m per 100 parts by weight of the vinyl chloride resin and which has a thickness of from 50 to 200 $\mu$m, and an adhesive layer formed on at least one side of PVC film, wherein a plurality of linear channels having a transverse cross section of V-shape or U-shape are formed on at least one side of the film in parallel to one another in the width direction of the adhesive tape, and, in the cross section of each channel, angles A and B which are angles of the respective opposing two inclined sides of the V-shape to the film plane, or which are angles of the tangential lines drawn at a ½ position in the depth of the channel on the respective opposing two curved sides of the U-shape, to the film plane, satisfy the following formulae ① to ④:

$A \leq B \leq 5A$ ①

$A + B \leq 110°$ ②

$10° \leq A \leq 50°$ ③

$20° \leq B \leq 90°$ ④

, the depth of the channels being from 1/20 to 2/5 of the thickness of the film, and the pitch of the channels being from 50 to 300 $\mu$m.

17 Claims, 3 Drawing Sheets

ADHESIVE TAPE MADE OF POLYVINYL CHLORIDE AND PROCESS FOR ITS PRODUCTION

BACKGROUND OF THE INVENTION

1. Field of the Invention

The present invention relates to an adhesive tape made of polyvinyl chloride, which is excellent in strength and which, at the same time, can readily be torn by finger tips and a process for producing such an adhesive tape made of polyvinyl chloride.

2. Discussion of Background

Heretofore, adhesive tapes made of paper, cloth, polyolefin resin and polyvinyl chloride have been widely used for sealing packages or corrugated board boxes, or for electrical insulation. Further, adhesive tapes made of polyolefin resin or polyvinyl chloride are used for repairing films for agricultural use, or for covering library books. Among them, an adhesive tape made of polyvinyl chloride has good water resistance and is excellent in strength, shape-following properties and electrical insulating properties. However, it can not easily be cut by finger tips and thus requires scissors or cutters. Accordingly, there has been a problem that it is inferior in the efficiency for packaging, covering or sealing operation.

A method of providing notches or perforations to adhesive tapes, has been commonly known as a method for improving the tearableness by finger tips. However, if such a method is applied to an adhesive tape made of polyvinyl chloride, the tensile strength tends to be extremely low. Accordingly, such a method has been impractical in a case of e.g. sealing where strength is required. Further, Japanese Unexamined Patent Publication No. 120784/1981 discloses a method of simply forming a score cut line or indent. If this method is applied to an adhesive tape of polyvinyl chloride, the tearableness will be good, but the strength tends to be inadequate again.

Further, Japanese Examined Patent Publication No. 13306/1975 discloses an adhesive tape having channels formed on its surface to improve the rewinding property of the tape and the property to be written by pencils or ink. However, this adhesive tape has had a problem that the strength and the tearableness can not be satisfied simultaneously.

Still further, Japanese Unexamined Patent Publication No. 286143/1995 discloses an adhesive tape made of polyvinyl chloride having channels of a specific shape formed thereon. However, the tearableness of the adhesive tapes disclosed in Examples of this publication, was not adequate.

SUMMARY OF THE INVENTION

It is an object of the present invention to provide and adhesive tape made of polyvinyl chloride which is excellent in strength and which, at the same time, can readily be torn by finger tips and a process for producing such an adhesive tape made of polyvinyl chloride.

The present invention provides (1) an adhesive tape made of polyvinyl chloride consisting essentially of a vinyl chloride resin film (hereinafter referred to as "PVC film" which contains from 5 to 60 parts by weight of inorganic fine particles having an average particle size of from 0.1 to 10 $\mu$m per 100 parts by weight of the vinyl chloride resin and which has a thickness of from 50 to 200 $\mu$m, and an adhesive layer formed on at least one side of PVC film, wherein a plurality of linear channels having a transverse cross section of V-shape or U-shape are formed on at least one side of the film in parallel to one another in the width direction of the adhesive tape, and, in the cross section of each channel, angles A and B which are angles of the respective opposing two inclined sides of the V-shape to the film plane, or which are angles of the tangential lines drawn at a ½ position in the depth of the channel on the respective opposing two curved sides of the U-shape, to the film plane, satisfy the following formulae ① to ④:

$A \leq B \leq 5A$     ①

$A+B \leq 110°$     ②

$10° \leq A \leq 50°$     ③

$20° \leq B \leq 90°$     ④

, the depth of the channels being from 1/20 to 2/5 of the thickness of the film, and the pitch of the channels being from 50 to 300 $\mu$m;

(2) the above adhesive tape made of polyvinyl chloride, wherein the plurality of linear channels having a transverse cross section of V-shape or U-shape are formed on only one side of the film;

(3) the above adhesive made of polyvinyl chloride, wherein the plurality of linear channels having a transverse cross section of V-shape or U-shape are formed on both sides of the film, so that the channels formed on one side of the film are in parallel to one another in the width direction of the adhesive tape, and the channels formed on the other side are in parallel to one another in the longitudinal direction of the adhesive tape; and (4) the above adhesive tape made of polyvinyl chloride, wherein depth D of the channels formed on one side of the film and depth D' of the channels formed on the other side, satisfy the following formula ⑤:

$0.5D \leq D' \leq 2D$     ⑤

Further, the present invention provides (A) a process for producing the above adhesive tape made of polyvinyl chloride wherein channels are formed on both sides of the film, which comprises, firstly supplying an unembossed PVC film heated to the film temperature of from 150° to 170° C. to a first embossing roll having a roll surface temperature of from 20° to 50° C. to apply embossing to one side; then (1) adjusting the temperature of the film to a level of from 0° to 70° C. and supplying the film to a second embossing roll having a roll surface temperature of from 140° to 160° C., which is not higher than the temperature of the film supplied to the first embossing roll, or (2) adjusting the temperature of the film to a level of from 130° to 150° C., which is lower by at least 10° C. than the temperature of the film supplied to the first embossing roll and supplying the film to a second embossing roll having a roll surface temperature of from 20° to 50° C., to apply embossing to the other side; and further coating an adhesive on at least one side of the film to form an adhesive layer; and (B) a process for producing the same adhesive tape made of polyvinyl chloride, which comprises, firstly supplying an unembossed PVC film having the film temperature of from 0° to 40° C. to a first embossing roll having a roll surface temperature of from 150° to 170° C. to apply embossing to one side; then (1) adjusting the temperature of the film to a level of from 0° to 70° C. and supplying the film to a second embossing roll having a roll surface temperature of from 140° to 160° C., which is not higher than the temperature of the first embossing roll, or (2) adjusting the temperature of the film to a level of from 130° to 150° C., which is lower by at least 10° C. than the temperature of the first embossing roll and supplying the film to a second embossing roll having a roll surface temperature of from 20° to 50° C., to apply embossing to the other side; and further coating an adhesive on at least one side of the film to form an adhesive layer.

Figure 1:
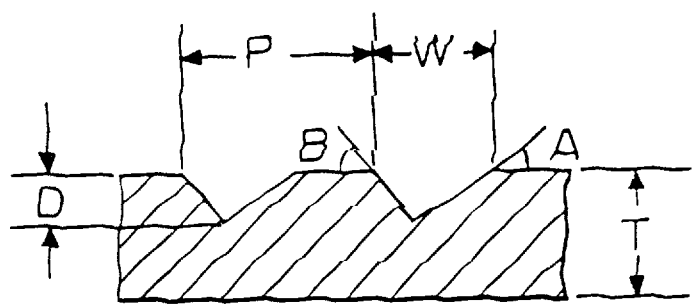
FIG. 1 is a diagrammatical cross sectional view of one embodiment of PVC film of the present invention wherein channels having a transverse cross section of V-shape, are formed on one side of the film.

Referring to the symbols used in the drawings:

A and B are angles of the respective opposing two inclined sides of the V-shape of the V-shaped cross section of a channel, to PVC film plane, or angles of the tangential lines drawn at a ½ position in the depth of the channel on the respective opposing two curved sides of the U-shape of the U-shaped cross section of a channel, to the film plane.

A' and B' are angles of an emboss of the embossing roll.

D is the depth of channels of PVC film.

P is the pitch of channels of PVC film.

P' is the pitch of embosses of the embossing roll.

T is the thickness of PVC film.

T' is the height of embosses of the embossing roll.

W is the width of a channel of PVC film.

a and b are tangential lines drawn at the ½ position in the depth of the channel having a cross sectional U-shape.

a' and b' indicate the ½ position in the depth of the channel of U-shape.

11 indicate PVC film, 12 an embossing roll (α), 13 a smooth rubber roll, and 14 an embossing roll (β).

DETAILED DESCRIPTION OF THE PREFERRED EMBODIMENTS

Now, the present invention will be described in detail with reference to the preferred embodiments.

In the present invention, the vinyl chloride resin means not only a homopolymer of vinyl chloride, but also a copolymer of vinyl chloride as the main component with other comonomers, and a mixture of the homopolymer and the copolymer. The vinyl chloride resin may be used as a blend with other polymers or copolymers.

The vinyl chloride resin film (hereinafter referred to simply as "PVC film") to be used in the present invention is preferably provided with flexibility, so that it is suitable for use in various applications. For this purpose, it is preferred to incorporate a plasticizer which is commonly employed for a vinyl chloride resin, in an amount of from 20 to 60 parts by weight per 100 parts by weight of the vinyl chloride resin.

In the present invention, inorganic particles are further incorporated to PVC film in an amount of from 5 to 60 parts by weight, preferably from 10 to 40 parts by weight, per 100 parts by weight of the vinyl chloride resin. The average particle size of such inorganic fine particles is from 0.1 to 10 $\mu$m, preferably from 0.5 to 5 $\mu$m. If the amount of the inorganic fine particles is less than 5 parts by weight, the effect for improving the tearableness tends to be poor, and if it exceeds 60 parts by weight, the strength of the adhesive tape tends to be poor. Specific examples of such inorganic fine particles include calcium carbonate, magnesium carbonate, aluminum oxide, silicon oxide, aluminum silicate and talc. Particularly preferred are calcium carbonate and magnesium carbonate, since they are readily available.

Further, additives such as a stabilizer, a lubricant, an antistatic agent, an ultraviolet absorber and a coloring agent may also be incorporated to the film, as the case requires.

As the stabilizer, calcium stearate, barium stearate, dibasic lead stearate, basic lead sulfite, dibasic lead phosphite, dibutyltin dilaurate, dibutyltin maleate, dibutyltin mercaptite, and a dioctyltin maleate stabilizer, a dioctyltin laurate stabilizer, a dioctyltin mercaptite stabilizer and/or a composite thereof may be employed. The amount of such a stabilizer is usually preferably from 0.1 to 10 parts by weight, more preferably from 1 to 5 parts by weight, per 100 parts by weight of the vinyl chloride resin.

As the lubricant, higher aliphatic acids or their metal salts, various paraffins, higher alcohols, natural waxes, polyethylene wax, fatty acid esters and fatty acid amides may, for example, be employed. The amount of the lubricant is preferably from 0.1 to 10 parts by weight per 100 parts by weight of the vinyl chloride resin.

As the antistatic agent, a polyoxyethylene alkylamine, a polyoxyethylene alkylamide, a polyoxyethylene alkylether, a glycerol fatty acid ester, a sorbitol fatty acid ester, an alkyl sulfonate, an alkyl benzene sulfonate, a quaternary ammonium chloride, or a quaternary ammonium sulfate may, for example, be used. The amount of the antistatic agent is preferably within a range of from 0.1 to 10 parts by weight per 100 parts by weight of the vinyl chloride resin.

As the ultraviolet absorber, a hydroquinone-type, salicylic acid-type, benzophenone-type or benzotriazole-type ultraviolet absorber may, for example, be employed. The amount of the ultraviolet absorber is preferably within a range of from 0.1 to 10 parts by weight per 100 parts by weight of the vinyl chloride resin.

As the coloring agent, an inorganic pigment such as titanium oxide, zinc white, white lead, calcium carbonate, gypsum, precipitated silica, carbon black, iron oxide red, Molybdenum Red, Cadmium Yellow, Chrome Yellow, Titanium Yellow, Chromium Oxide Green or Ultra Marine Blue; or an organic pigment such as a Permanent Red 4R, Hansa Yellow 10G, Benzidine Yellow GR, Permanent Carmine FB, Phthalocyanine Blue B or Phthalocyanine Green, may, for example, be employed. The amount of the coloring agent is preferably within a range of from 3 to 150 parts by weight per 100 parts by weight of the vinyl chloride resin.

The film to be used in the present invention may be prepared by mixing the above additives to the vinyl chloride resin by means of a blender or mixer such as a ribbon blender, a Banbury mixer or a super mixer (Henshel mixer), and then subjecting the obtained composition to a conventional forming method such as an inflation method, a calender method or a solution casting method.

The thickness of the film is from 50 to 200 $\mu$m from the viewpoint of the strength and the efficiency for packaging or sealing operation.

As a method for providing channels to the film, a method may be mentioned in which the film is processed by an embossing roll or a pressing plate having specific convexes or concavities/convexes. The processing by such an embossing roll is carried out by supplying and pressing the film between an embossing roll (made of metal) and a rubber roll which are mutually opposingly rotated, whereby an embossed PVC film is obtained.

A method for preparing such an embossing roll may, for example, be a method in which a metal roll is directly processed by cutting, or a method wherein the embossing roll is prepared by photoelectroforming (a combination of photoresist and electroforming). The channels are required to be linearly formed on at least one side of the film, so that they are in parallel to one another in the width direction of the adhesive tape of polyvinyl chloride (i.e. perpendicular to the longitudinal direction of the tape). The cross section of the channels is V-shape or U-shape. In the cross section of each channel, angles A and B which are angles of the respective opposing two inclined sides of the V-shape to the film plane (FIG. 1), or which are angles of the tangential lines (a and b in FIG. 2) drawn at a ½ position in the depth of the channel on the respective opposing two curved sides of the U-shape, to the film plane (FIG. 2), satisfy the following formulae ① to ④:

$$A \leq B \leq 5A \qquad ①$$

$$A+B \leq 110° \qquad ②$$

$$10° \leq A \leq 50° \qquad ③$$

$$20° \leq \leq B \leq 90° \qquad ④$$

Figure 2:
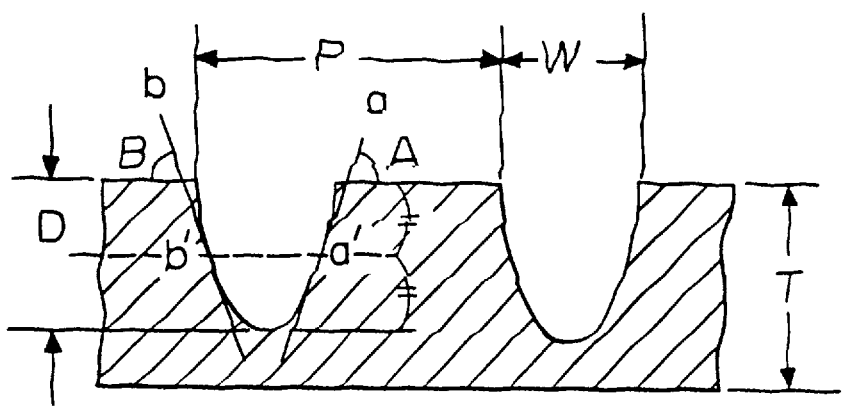
FIG. 2 is a diagrammatical cross sectional view of another embodiment of PVC film of the present invention wherein channels having a transverse cross section of U-shape, are formed on one side of the film.

The depth of channels (D in FIGS. 1 and 2) is from 1/20 to 2/5, preferably from 1/10 to 3/10, of the thickness of the film (T in FIGS. 1 and 2). The pitch (P in FIGS. 1 and 2) of the channels is from 50 to 300 $\mu$m, preferably from 100 to 250 $\mu$m.

If the configuration of the channels is outside the above ranges, it will be difficult to attain the strength and the tearableness by finger tips simultaneously. When the configuration of the channels satisfies the above ranges, and the above-prescribed inorganic fine particles are incorporated in the adhesive tape, it is possible to obtain an adhesive tape which is excellent in strength and which at the same time, is capable of being readily torn by finger tips.

The adhesive tape of the present invention may have channels formed on both sides of the film depending upon the particular purpose. In this case, the channels may be formed so that on both sides, they are in parallel to one another in the width direction of the adhesive tape. Otherwise, they may be formed so that the channels formed on one side of the film are in parallel to one another in the width direction of the adhesive tape, and the channels formed on the other side are in parallel to one another in the longitudinal direction of the adhesive tape. The latter case is especially preferred, since such a construction is suitable for various types of applications. For example, such a construction is advantageously used in a case where the tearableness in both longitudinal and transverse directions is required, and the tearableness in one direction only is inadequate in the efficiency for operation, as in the case for covering library books. The cross sectional shape of the channels may be the same or different as between the two sides. Further, the depth (D) of channels formed on one side and the depth (D') of channels formed on the other side preferably satisfy the following formula ⑤:

$$0.5D \leq D' \leq 2D \qquad ⑤$$

The following two methods (A) and (B) are available to form channels so that the channels formed on one side of the film are in parallel to one another in the width direction of the adhesive tape, and the channels formed on the other side are in parallel to one another in the longitudinal direction of the adhesive tape.

(A) An unembossed PVC film having the film temperature adjusted to a level of from 150° to 170° C. is supplied to a first embossing roll having a roll surface temperature of from 20° to 50° C. to form linear channels which are in parallel to one another in the width direction of the film, or linear channels which are in parallel to one another in the longitudinal direction of the film. Then, to form linear channels having a different direction on the other side, (1) the film temperature is adjusted to a level of from 0° to 70° C., and the film is supplied to a second embossing roll having a roll surface temperature of from 140° to 160° C., which is not higher than the temperature of the film supplied to the first embossing roll, or (2) the film temperature is adjusted to a level of from 130° to 150° C., which is lower by at least 10° C. than the temperature of the film supplied to the first embossing roll, and the film is supplied to a second embossing roll having a roll surface temperature of from 20° to 50° C.

(B) An unembossed PVC film having a film temperature of from 0° to 40° C. is supplied to a first embossing roll having a roll surface temperature of from 150° to 170° C. to form linear channels which are in parallel to one another in the width direction of the film, or linear channels which are in parallel to one another in the longitudinal direction of the film, on one side. Then, to form linear channels having a different direction on the other side, (1) the film temperature is adjusted to a level of from 0° to 70° C., and the film is supplied to a second embossing roll having a roll surface temperature of from 140° to 160° C. which is not higher than the temperature of the first embossing roll, or (2) the film temperature is adjusted to a level of from 130° to 150° C., which is lower by at least 10° C. than the temperature of the first embossing roll, and the film is supplied to a second embossing roll having a roll surface temperature of from 20° to 50° C. To adjust the film temperature to a level of from 130° to 170° C., various heaters, heating rolls or hot air may, for example, be used for heating. To adjust the surface temperature of the embossing roll to a level of 140° to 170° C., the roll may be heated by a heating medium such as steam or oil. The line speed and the embossing linear pressure (the pressure between the embossing roll and the back roll) for embossing may be within the ranges which are commonly employed for embossing. Specifically, the line speed is preferably from 5 to 140 m/min, and the embossing linear pressure is preferably from 0.2 to 20 kg/cm.

If the embossing conditions are outside the above ranges, it tends to be difficult to apply embossing satisfactorily to the film, or the surface once embossed tends to return to end up with an incompletely embossed surface.

Now, the adhesive to be used in the present invention may, for example, be a natural rubber adhesive or a synthetic resin adhesive such as an acrylic adhesive.

To form an adhesive layer on the film having predetermined channels formed thereon, a coating liquid having the adhesive dissolved in a solvent such as toluene or ethyl acetate, may be coated directly on the film surface by a conventional method such as reverse coating, following by drying, or may be coated and dried once on a release paper and then transferred to the film surface.

The thickness of the adhesive layer is usually from 10 to 30 μm.

Now, the present invention will be described in further detail with reference to Examples. However, it should be understood that the present invention is by no means restricted to such specific Examples.

Figure 3A:
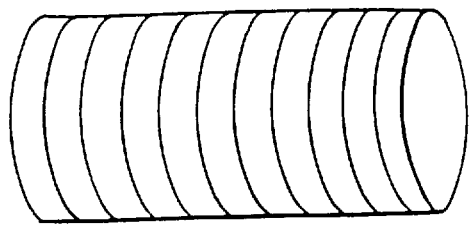
FIG. 3(a) is a diagrammatical view of an embossing roll (α) used in the Examples.
Figure 3B:
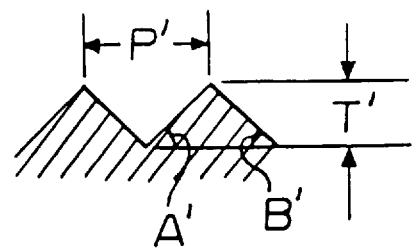
FIG. 3(b) is a diagrammatical cross sectional view of one embodiment of the surface of the embossing roll (α).
Figure 4A:
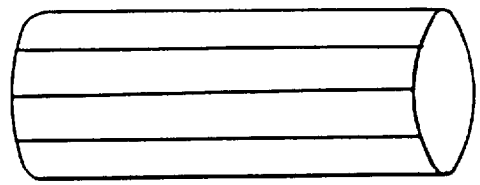
FIG. 4(c) is a diagrammatical view of an embossing roll (β) used in the Examples.
FIG. 4(d) is a diagrammatical cross sectional view of one embodiment of the surface of the embossing roll (β).
Figure 4B:
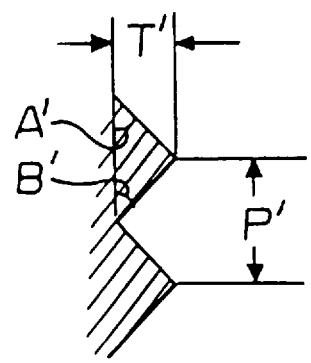

100 parts by weight of polyvinyl chloride (average degree of polymerization: 1,100), 35 parts by weight of di-2-ethylhexyl phthalate, 1 part by weight of a Ba-Zn type composite liquid stabilizer, 1 part by weight of a Ba-Zn type composite powder stabilizer, 0.5 part by weight methylene bisstearoamide and a predetermined amount of inorganic fine particles as identified in Table 1 (in Examples 4 to 7 and Comparative Examples 7 to 8, 20 parts by weight of calcium carbonate was incorporated), were blended and mixed by a Henshel mixer. The mixture was supplied to a calendering apparatus heated to 180° C. to obtain PVC film having a thickness of 100 μm. By cutting, embossing rolls having a diameter of 210 mm, surface configurations as shown in FIGS. 3 and 4 and pitches and heights of embosses as identified in Tables 1 and 3, were prepared.

EXAMPLES 1 TO 3 AND COMPARATIVE EXAMPLES 1 TO 6

By using the films prepared as described above and adjusting the configurations of the embossed surfaces of the embossing rolls as identified in Tables 1 and 3, films of Examples 1 to 3 and Comparative Examples 1 to 6 were prepared. For example, the film in Example 1 was prepared in such a manner that using an embossing roll having a diameter of 210 mm and having a surface configuration such that the pitch (P' in FIG. 3) of embosses was 200 μm and the height (T' in FIG. 3) thereof was 95 μm, the film heated to 130° C. by an infrared heater was passed under a linear pressure of 0.4 kg/cm between the water-cooled embossing roll and a water-cooled rubber roll to form linear channels which are in parallel to one another in the width direction of the adhesive tape, on one side of the film. On the smooth surface side of the embossed film thus obtained, an acrylic adhesive was coated so that the thickness after drying would be 25 μm, followed by drying at 100° C. to obtain an adhesive PVC film. Then, this film was cut into an adhesive tape having a width of 5 cm and a length of 20 cm.

EXAMPLES 4 AND 5 AND COMPARATIVE EXAMPLE 7

Figure 5:
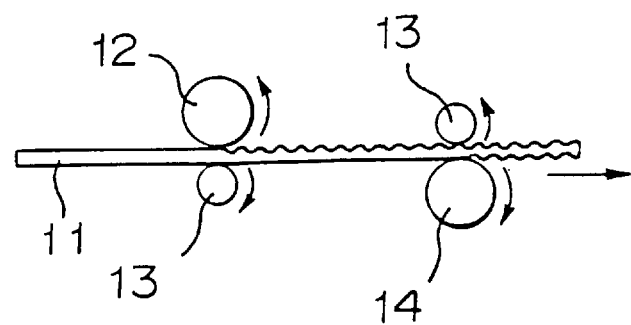
FIG. 5 is a diagrammatical view illustrating the production of a double sided embossed PVC film.

As shown in FIG. 5, the film 11 prepared as described above was heated to a temperature as identified in Table 4 by an infrared heater and passed under a linear pressure of 0.5 kg/cm between a water-cooled embossing roll (α) 12 of 25° C. and a smooth rubber roll 13 to apply embossing in the longitudinal direction on one side, and then the film embossed on one side was passed under a linear pressure of 0.5 kg/cm between an embossing roll (β) 14 heated by steam to a temperature as identified in Table 4 and a smooth rubber roll 13 (in Example 5, the film was again heated to 140° C. and then passed through a water-cooled embossing roll (β) of 25° C. and a smooth rubber roll), so that the first embossed surface faced the smooth rubber roll side, to apply embossing in the width direction on the other side.

EXAMPLES 6 AND 7 AND COMPARATIVE EXAMPLE 8

In the same manner as above Examples 4 and 5 and Comparative Example 7, the film of room temperature (25° C.) prepared as described above, was passed under a linear pressure of 0.5 kg/cm between an embossing roll (α) heated by steam to a temperature as identified in Table 4 and a smooth rubber roll to apply embossing in the longitudinal direction on one side, and then the film embossed on one side was passed under a linear pressure of 0.5 kg/cm between an embossing roll (β) heated by steam to a temperature as identified in Table 4 and a smooth rubber roll (in Example 7, the film was heated by an infrared heater to 140° C. and passed between a watercooled embossing roll (β) of 25° C. and a smooth rubber roll) so that the first embossed surface faced the smooth rubber roll side, to apply embossing in the width direction on the other side.

Figure 6:
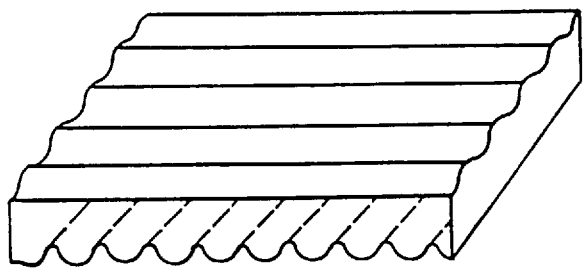
FIG. 6 is a diagrammatical view of a double sided embossed PVC film.

On one side of the double sided embossed PVC film as shown in FIG. 6 (Examples 4 to 7 and Comparative Examples 7 and 8) thus obtained, a silicon release agent was coated and on the other side, an acrylic adhesive was coated so that the coated PVC film thickness after drying would be 20 μm, followed by drying at 100° C. to obtain an adhesive PVC film. Further, this adhesive PVC film was cut to obtain an adhesive tape having a width of 5 cm and a length of 20 cm.

With respect to fifteen types of adhesive tapes thus obtained, tearableness by finger tips and strength were evaluated, and the results are shown in Tables 2 and 4. The evaluation methods are as follows.

(1) Tearableness by finger tips (Examples 1 to 7 and Comparative Example 1 to 8)

Without using a tool such as a cutter or scissors, the adhesive tape was torn by finger tips of both hands in the width direction or longitudinal direction of the adhesive tape, whereby tearableness was evaluated. The evaluation standards are as follows.

○: Readily torn without requiring any substantial force. (The cut line was linear.)

Δ: A little force was required at the initial stage of tearing, but the tape was readily torn once tearing started. (The cut line was linear.)

X: Tearing was difficult, and the tape stretched when it was attempted to tear. (The cut line was waving.)

(2) Strength (Examples 1 to 3 and Comparative Examples 1 to 6)

① In the transverse direction (the width direction) of the adhesive tape, the Elemendorf tear strength was measured in accordance with JIS K6732 (provided that the size of the adhesive tape was as mentioned above).

② With respect to the lengthwise direction (the longitudinal direction) of the adhesive tape, the tensile strength and elongation were measured in accordance with JIS Z0237 (provided that the size of the adhesive tape was as described above).

(Examples 4 to 7 and Comparative Example 7 and 8)

With respect to the transverse direction (the width direction) and the lengthwise direction (the longitudinal direction) of the adhesive tape, the tensile strength and elongation were measured in accordance with JIS Z0237 (provided that the size of the adhesive tape was as described above).

TABLE 1

| | Inorganic fine particles | | | Surface configuration of the embossing roll | | | | | Embossed configuration of the film | | | |
|---|---|---|---|---|---|---|---|---|---|---|---|---|
| | | Average particle size | Amount | Pitch of embosses | Height of embosses | Angles of embosses (°) | | Pitch of channels | Depth of channels | | Angles of inclined sides of a channel (°) | |
| | Type | (μm) | (PHH) | (μm) | (μm) | A' | B' | (μm) | (μm) | | A | B |
| Example 1 | Calcium carbonate | 2.5 | 10 | 200 | 95 | 30 | 60 | 200 | 20 | | 18 | 44 |
| Example 2 | Magnesium carbonate | 2.0 | 15 | 150 | 90 | 50 | 50 | 150 | 18 | | 29 | 29 |
| Example 3 | Calcium carbonate | 1.5 | 20 | 100 | 88 | 60 | 60 | 100 | 15 | | 36 | 36 |
| Comparative Example 1 | — | — | — | 200 | 95 | 30 | 60 | 200 | 20 | | 18 | 44 |
| Comparative Example 2 | Calcium carbonate | 2.5 | 10 | 150 | 90 | 50 | 50 | 150 | 6 | | 15 | 15 |
| Comparative Example 3 | Calcium carbonate | 0.05 | 20 | 100 | 88 | 60 | 60 | 100 | 15 | | 36 | 36 |
| Comparative Example 4 | Calcium carbonate | 15 | 50 | 100 | 88 | 60 | 60 | 100 | 45 | | 56 | 56 |
| Comparative Example 5 | Silicon oxide | 0.1 | 40 | — | — | — | — | — | — | | — | — |
| Comparative Example 6 | — | — | — | — | — | — | — | — | — | | — | — |

TABLE 2

| | | Strength | | |
|---|---|---|---|---|
| | Tearableness | Elemendorf tear strength (gf)* | Tensile strength (kg/cm) | Elongation (%) |
| Example 1 | ○ | 250 (360) | 2.9 | 280 |
| Example 2 | ○ | 240 (350) | 2.9 | 280 |
| Example 3 | ○ | 240 (350) | 2.8 | 270 |
| Comparative Example 1 | Δ | 260 (780) | 2.9 | 280 |
| Comparative Example 2 | X | 880 | 3.0 | 290 |
| Comparative Example 3 | Δ | 260 (770) | 2.9 | 280 |
| Comparative Example 4 | ○ | 210 (300) | 0.7 | 80 |
| Comparative Example 5 | X | 980 | 2.9 | 290 |
| Comparative Example 6 | X | 1030 | 3.1 | 300 |

*The value in the bracket ( ) is a value when no notch was provided.

TABLE 3

| | Surface configurations of the embossing rolls | | | | | | | |
|---|---|---|---|---|---|---|---|---|
| | Embossing roll (α) | | | | Embossing roll (β) | | | |
| | Pitch of embosses | Height of embosses | Angles of embosses (°) | | Pitch of embosses | Height of embosses | Angles of embosses (°) | |
| | (μm) | (μm) | A' | B' | (μm) | (μm) | A' | B' |
| Example 4 | 200 | 100 | 45 | 45 | 200 | 100 | 45 | 45 |
| Example 5 | 250 | 100 | 30 | 60 | 100 | 60 | 50 | 50 |
| Example 6 | 200 | 100 | 45 | 45 | 200 | 100 | 45 | 45 |
| Example 7 | 250 | 100 | 30 | 60 | 100 | 60 | 50 | 50 |
| Comparative Example 7 | 200 | 100 | 45 | 45 | 100 | 60 | 50 | 50 |
| Comparative Example 8 | 200 | 100 | 45 | 45 | 100 | 60 | 50 | 50 |

TABLE 4

| | Processing conditions of the embossing roll (α) | | | Processing conditions of the embossing roll (β) | | | Embossed configuration of the film | | | | | | | |
|---|---|---|---|---|---|---|---|---|---|---|---|---|---|---|
| | | | | | | | Configuration by the embossing roll (α) | | | | Configuration by the embossing roll (β) | | | |
| | Roll temp. | In-coming film temp. | Out-going film temp. | Roll temp. | In-coming film temp. | Out-going film temp. | Depth of channels | Pitch of channels | Angles of inclined sides of a channel (°) | | Depth of channels | Pitch of channels | Angles of inclined sides of a channel (°) | |
| | (°C.) | (°C.) | (°C.) | (°C.) | (°C.) | (°C.) | μm | μm | A | B | μm | μm | A | B |
| Example 4 | 25 | 160 | 32 | 145 | 30 | 115 | 27 | 200 | 31 | 31 | 24 | 200 | 31 | 31 |
| Example 5 | 25 | 145 | 30 | 25 | 140 | 35 | 26 | 250 | 22 | 45 | 14 | 100 | 34 | 34 |
| Example 6 | 170 | 25 | 120 | 150 | 26 | 116 | 26 | 200 | 33 | 33 | 23 | 200 | 31 | 31 |
| Example 7 | 155 | 25 | 118 | 25 | 140 | 35 | 26 | 250 | 18 | 42 | 14 | 100 | 34 | 34 |
| Comparative Example 7 | 25 | 145 | 30 | 175 | 30 | 115 | 4 | 200 | 8 | 8 | 45 | 100 | 48 | 48 |
| Comparative Example 8 | 155 | 25 | 112 | 175 | 30 | 115 | 3 | 200 | 8 | 8 | 45 | 100 | 48 | 48 |

| | Tearable-ness by finger tips | | Strength | | | |
|---|---|---|---|---|---|---|
| | | | Tensile strength (kg/cm) | | Elonga-tion (%) | |
| | Lengthwise | Transverse | Lengthwise | Transverse | Lengthwise | Transverse |
| Example 4 | ○ | ○ | 2.8 | 2.2 | 250 | 220 |
| Example 5 | ○ | ○ | 2.9 | 2.1 | 260 | 220 |
| Example 6 | ○ | ○ | 2.9 | 2.3 | 250 | 220 |
| Example 7 | ○ | ○ | 2.9 | 2.2 | 260 | 220 |
| Comparative Example 7 | X | ○ | 0.8 | 1.0 | 80 | 180 |
| Comparative Example 8 | X | ○ | 0.8 | 1.0 | 80 | 180 |

From the foregoing results, the following is evident.

Comparative Example 1 represents a case of prior art wherein no inorganic fine particles are incorporated in PVC film, and such an adhesive tape is inferior in the tearableness, as compared with the adhesive tape of the present invention.

Comparative Example 2 represents a case wherein the embossed configuration (angle B) of the film does not meet the condition (Formula ④) of the present invention i.e. angle B is small, whereby the tearableness is poor as compared with the adhesive tape of the present invention.

Comparative Example 3 represents a case wherein the average particle size of inorganic fine particles incorporated does not meet the condition of the present invention i.e. it is small, whereby the tearableness is poor as compared with the adhesive tape of the present invention.

Comparative Example 4 represents a case wherein the average particle size of inorganic fine particles incorporated does not meet the condition of the present invention i.e. it is large, and further the embossed configuration of the film does not meet the condition of the present invention (the depth of channels is deeper than the condition of the present invention, and angle A does not meet the formula ③ i.e. large), whereby the tensile strength is poor, although the tearableness is good.

Comparative Example 5 represents a case where no channels are formed in the film, whereby the tearableness is poor as compared with the adhesive tape of the present invention.

Comparative Example 6 represents a case wherein no inorganic fine particles are incorporated in the film, and no channels are formed, whereby the tearableness is poor as compared with the adhesive tape of the present invention.

Comparative Example 7 represents a case wherein the processing condition of the film does not meet the condition of the present invention (with respect to the processing conditions as defined in claim 14 or 15, the incoming film temperature at the embossing roll (α) is low, and the roll temperature at the embossing roll (β) is high), whereby the embossing configuration in the longitudinal direction of the film does not meet the condition of the present invention (the depth of channels is less than the condition of the present invention, and angles A and B do not meet the conditions of the formulas ① to ④), whereby the tearableness in the longitudinal direction of the adhesive tape is poor, and the tensile strength is also poor.

Comparative Example 8 represents a case wherein the processing conditions of the film do not meet the conditions of the present invention (with respect to the processing conditions as defined in (1) in claim 16 or 17, the roll temperature at the embossing roll (β) is high), whereby the embossed configuration of the film in the longitudinal direction does not meet the conditions of the present invention (the depth of channels is less than the condition of the present invention, and angles A and B do not meet the conditions of the formulas ① to ④), whereby the tearableness in the longitudinal direction of the adhesive tape is poor, and the tensile strength is also poor.

What is claimed is:

1. An adhesive tape made of polyvinyl chloride consisting essentially of a vinyl chloride resin film (hereinafter referred to as "PVC film") which contains from 5 to 60 parts by weight of inorganic fine particles having an average particle size of from 0.1 to 10 μm per 100 parts by weight of the vinyl chloride resin and which has a thickness of from 50 to 200

μm, and an adhesive layer formed on at least one side of PVC film, wherein a plurality of linear channels having a transverse cross section of V-shape or U-shape are formed on at least one side of the film in parallel to one another in the width direction of the adhesive tape, and, in the cross section of each channel, angles A and B which are angles of the respective opposing two inclined sides of the V-shape to the film plane, or which are angles of the tangential lines drawn at a ½ position in the depth of the channel on the respective opposing two curved sides of the U-shape, to the film plane, satisfy the following formulae ①  to ④:

$A \leq B \leq 5A$ ①

$A+B \leq 110°$ ②

$10° \leq A \leq 50°$ ③

$20° \leq B \leq 90°$, ④ the depth of the channels being from 1/20 to 2/5 of the thickness of the film, and the pitch of the channels being from 50 to 300 μm.

2. The adhesive tape made of polyvinyl chloride according to claim 1, wherein the plurality of linear channels having a transverse cross section of V-shape or U-shape are formed on only one side of the film.

3. The adhesive tape made of polyvinyl chloride according to claim 1, wherein the plurality of linear channels having a transverse cross section of V-shape or U-shape are formed on both sides of the film, so that the channels formed on one side of the film are in parallel to one another in the width direction of the adhesive tape, and the channels formed on the other side are in parallel to one another in the longitudinal direction of the adhesive tape.

4. The adhesive tape made of polyvinyl chloride according to claim 3, wherein depth D of the channels formed on one side of the film and depth D' of the channels formed on the other side, satisfy the following formula ⑤;

$0.5D \leq D' \leq 2D$ ⑤.

5. The adhesive tape made of polyvinyl chloride according to claim 1, wherein the inorganic fine particles have an average particle size of from 0.5 to 5 μm.

6. The adhesive tape made of polyvinyl chloride according to claim 2, wherein the inorganic fine particles have an average particle size of from 0.5 to 5 μm.

7. The adhesive tape made of polyvinyl chloride according to claim 3, wherein the inorganic fine particles have an average particle size of from 0.5 to 5 μm.

8. The adhesive tape made of polyvinyl chloride according to claim 4, wherein the inorganic fine particles have an average particle size of from 0.5 to 5 μm.

9. The adhesive tape made of polyvinyl chloride according to claim 1, wherein the inorganic fine particles are of calcium carbonate or magnesium carbonate.

10. The adhesive tape made of polyvinyl chloride according to claim 2, wherein the inorganic fine particles are of calcium carbonate or magnesium carbonate.

11. The adhesive tape made of polyvinyl chloride according to claim 3, wherein the inorganic fine particles are of calcium carbonate or magnesium carbonate.

12. The adhesive tape made of polyvinyl chloride according to claim 4, wherein the inorganic fine particles are of calcium carbonate or magnesium carbonate.

13. The adhesive tape made of polyvinyl chloride according to claim 5, wherein the inorganic fine particles are of calcium carbonate or magnesium carbonate.

14. A process for producing the adhesive tape made of polyvinyl chloride as defined in claim 3, which comprises, firstly supplying an unembossed PVC film heated to the film temperature of from 150° to 170° C. to a first embossing roll having a roll surface temperature of from 20° to 50° C. to apply embossing to one side; then (1) adjusting the temperature of the film to a level of from 0° to 70° C. and supplying the film to a second embossing roll having a roll surface temperature of from 140° to 160° C., which is not higher than the temperature of the film supplied to the first embossing roll, or (2) adjusting the temperature of the film to a level of from 130° to 150° C., which is lower by at least 10° C. than the temperature of the film supplied to the first embossing roll and supplying the film to a second embossing roll having a roll surface temperature of from 20° to 50° C., to apply embossing to the other side; and further coating an adhesive on at least one side of the film to form an adhesive layer.

15. A process for producing the adhesive tape made of polyvinyl chloride as defined in claim 4, which comprises, firstly supplying an unembossed PVC film heated to the film temperature of from 150° to 170° C. to a first embossing roll having a roll surface temperature of from 20° to 50° C. to apply embossing to one side; then (1) adjusting the temperature of the film to a level of from 0° to 70° C. and supplying the film to a second embossing roll having a roll surface temperature of from 140° to 160° C., which is not higher than the temperature of the film supplied to the first embossing roll, or (2) adjusting the temperature of the film to a level of from 130° to 150° C., which is lower by at least 10° C. than the temperature of the film supplied to the first embossing roll and supplying the film to a second embossing roll having a roll surface temperature of from 20° to 50° C., to apply embossing to the other side; and further coating an adhesive on at least one side of the film to form an adhesive layer.

16. A process for producing the adhesive tape made of polyvinyl chloride as defined in claim 3, which comprises, firstly supplying an unembossed PVC film having the film temperature of from 0° to 40° C. to a first embossing roll having a roll surface temperature of from 150° to 170° C. to apply embossing to one side; then (1) adjusting the temperature of the film to a level of from 0° to 70° C. and supplying the film to a second embossing roll having a roll surface temperature of from 140° to 160° C., which is not higher than the temperature of the first embossing roll, or (2) adjusting the temperature of the film to a level of from 130° to 150° C., which is lower by at least 10° C. than the temperature of the first embossing roll and supplying the film to a second embossing roll having a roll surface temperature of from 20° to 50° C., to apply embossing to the other side; and further coating an adhesive on at least one side of the film to form an adhesive layer.

17. A process for producing the adhesive tape made of polyvinyl chloride as defined in claim 4, which comprises, firstly supplying an unembossed PVC film having the film temperature of from 0° to 40° C. to a first embossing roll having a roll surface temperature of from 150° to 170° C. to apply embossing to one side; then (1) adjusting the temperature of the film to a level of from 0° to 70° C. and supplying the film to a second embossing roll having a roll surface temperature of from 140° to 160° C., which is not higher than the temperature of the first embossing roll, or (2) adjusting the temperature of the film to a level of from 130° to 150° C., which is lower by at least 10° C. than the temperature of the first embossing roll and supplying the film to a second embossing roll having a roll surface temperature of from 20° to 50° C., to apply embossing to the other side; and further coating an adhesive on at least one side of the film to form an adhesive layer.

* * * * *